United States Patent
Rouxel et al.

(10) Patent No.: US 9,290,112 B2
(45) Date of Patent: Mar. 22, 2016

(54) VEHICLE SEAT PROVIDED WITH A REMOVABLE TRAY

(71) Applicant: RENAULT S.A.S., Boulogne Billancourt (FR)

(72) Inventors: Yves Rouxel, Versailles (FR); Herve Folliot, Maule (FR)

(73) Assignee: RENAULT S.A.S., Boulogne Billancourt (FR)

( * ) Notice: Subject to any disclaimer, the term of this patent is extended or adjusted under 35 U.S.C. 154(b) by 0 days.

(21) Appl. No.: 14/358,893

(22) PCT Filed: Nov. 5, 2012

(86) PCT No.: PCT/EP2012/071843
§ 371 (c)(1),
(2) Date: May 16, 2014

(87) PCT Pub. No.: WO2013/072211
PCT Pub. Date: May 23, 2013

(65) Prior Publication Data
US 2014/0319885 A1   Oct. 30, 2014

(30) Foreign Application Priority Data

Nov. 16, 2011 (FR) ...................... 11 60412

(51) Int. Cl.
*A47B 39/00* (2006.01)
*B60N 2/20* (2006.01)
*B60N 3/00* (2006.01)

(52) U.S. Cl.
CPC ................ *B60N 2/206* (2013.01); *B60N 3/001* (2013.01); *B60N 3/004* (2013.01)

(58) Field of Classification Search
CPC .......... A47C 7/62; B60R 7/043; B60N 2/206; B60N 3/004
USPC ............. 297/188.01, 188.04, 188.05, 188.06, 297/188.07, 188.21, 167
See application file for complete search history.

(56) References Cited

U.S. PATENT DOCUMENTS

| D368,189 | S | * | 3/1996 | Bro et al. ........................ D6/480 |
| 6,059,358 | A | * | 5/2000 | Demick et al. ........... 297/188.04 |
| 6,220,660 | B1 | * | 4/2001 | Bedro et al. ............. 297/188.04 |
| 6,273,310 | B1 | * | 8/2001 | Gregory ........................ 224/275 |

(Continued)

FOREIGN PATENT DOCUMENTS

| FR | 2 924 387 | 6/2009 |
| GB | 2 424 575 | 10/2006 |

OTHER PUBLICATIONS

U.S. Appl. No. 14/358,905, filed May 16, 2014, Rouxel, et al.

(Continued)

*Primary Examiner* — Laurie Cranmer
(74) *Attorney, Agent, or Firm* — Oblon, McClelland, Maier & Neustadt, L.L.P.

(57) ABSTRACT

A motor vehicle seat including a seat part and a foldable seatback including a rear face including a tray, the seatback configured to be folded onto the seat part to bring the rear face thereof into a substantially horizontal position. The tray is affixed against the rear face of the seatback and is held against the face by a locking mechanism including an actuating member, and a pressure exerted on the actuating member releases the tray such that the tray can be removed from the seatback.

15 Claims, 3 Drawing Sheets

(56) References Cited

U.S. PATENT DOCUMENTS

| | | | |
|---|---|---|---|
| 6,382,745 B1 * | 5/2002 | Adkins | 312/223.3 |
| 6,702,375 B1 * | 3/2004 | Laskowski et al. | 297/188.07 |
| 7,300,105 B2 * | 11/2007 | Jasinski et al. | 297/188.04 |
| 7,303,226 B2 * | 12/2007 | Bernstein et al. | 296/190.01 |
| 7,562,931 B2 * | 7/2009 | Stojanovic | 297/188.04 |
| 7,607,726 B2 * | 10/2009 | Orlo et al. | 297/125 |
| 8,167,366 B2 * | 5/2012 | Charpentier et al. | 297/125 |
| 2002/0060481 A1 * | 5/2002 | Jones | 297/188.04 |
| 2010/0109389 A1 * | 5/2010 | Charpentier et al. | 297/173 |

OTHER PUBLICATIONS

International Search Report Issued Apr. 17, 2013 in PCT/EP12/071843 Filed May 11, 2012.

French Search Report Issued Oct. 30, 2012 in FR 1160412 Filed Nov. 16, 2011.

* cited by examiner

VEHICLE SEAT PROVIDED WITH A REMOVABLE TRAY

BACKGROUND

The invention relates to a vehicle seat which is provided with a removable tray. Vehicle seats are unavoidable and imposing elements in a vehicle passenger space and it may therefore be found to be advantageous to configure them so that they can ensure additional functions, whilst retaining a substantially constant spatial requirement. A vehicle seat according to the invention has been modified in relation to a conventional seat in order to fulfill a new function.

It is assumed that a vehicle seat according to the invention comprises a seat member and a foldable backrest, in a conventional and implicit manner.

Vehicle seats provided with a tray exist and patents already relate to them. For example, it is possible to cite the patent FR2911548 which relates to a vehicle seat, the rear face of the backrest of which is provided with a movable tray. More specifically, once the backrest has been folded onto the seat member, the tray is in a substantially horizontal position and can pivot about a vertical axis in order to be able to be moved away laterally at one side or the other of the seat. Although this tray is functional and ergonomic in terms of its support function, it is connected permanently to the seat without being able to be dissociated therefrom, and without being able to be used at a different location from the one in which it is stored on the backrest of said seat.

BRIEF SUMMARY

A vehicle seat according to the invention comprises a tray which is stored in its backrest and which can rapidly and simply be withdrawn from that backrest in order to be used independently of its storage location at the rear of the backrest. Once it has been withdrawn from its storage location behind the backrest, the tray may be fixed to another region of said seat or to another element of the passenger space, and can even be used at the outer side of the vehicle. It is assumed that the tray can be disassembled from the seat rapidly and without effort and without the use of any external tooling at all.

The invention relates to a seat of a motor vehicle comprising a seat member and a foldable backrest comprising a rear face which is provided with a tray, the backrest being capable of being folded onto the seat member so as to bring its rear face into a substantially horizontal position. The main feature of a seat according to the invention is that the tray is fitted against the rear face of the backrest and is retained against said face by means of a locking mechanism provided with an activation member, a pressure applied to said member allowing the tray to be released so that it can be withdrawn from the backrest. In other words, the tray does not comprise any intrinsic fixing location which allows it to be stowed on the seat. It is simply retained in a given position against the backrest of said seat by means of a mechanism which can be activated by pressure. The release time of the tray corresponds to the time for which pressure is applied to the activation member and is therefore extremely short, of the order of one second. The device for assembling the tray in the backrest of the seat is therefore simplified in the extreme and may amount to the interaction between said tray and the locking mechanism. In a preferred manner, the pressure applied to the activation member is manual, by means of one or two fingers. The tray may represent a large number of objects such as, for example, a games console, a portable computer or a paper document support. It is naturally supposed that the tray may again take up its storage location behind the backrest just as quickly and simply. Therefore, the assembly/disassembly process of the tray is completely reversible.

The locking mechanism advantageously involves at least one mechanical stop which is brought into contact with the tray in order to maintain it against the backrest, a pressure applied to the activation member bringing about the movement of each stop. A locking mechanism configuration which is simple, inexpensive and has small dimensions, and which is simple to implement, without requiring any particular effort, is involved.

The locking mechanism is preferably provided with a return element which is configured to allow the activation member to resume its initial position after being subjected to pressure. In this manner, that return element contributes to maintaining by default the mechanism in a position for locking the tray.

In an advantageous manner, the backrest has a headrest and a recess which is provided for receiving the tray, the locking mechanism being located in the region of the end of the recess nearest said headrest. The headrest represents the highest region of the backrest when it is in a vertical plane, and the most advanced region of said backrest when it is folded onto the seat member. The recess is provided to receive the tray in such a manner that the tray does not project from said backrest. Generally, the tray is a planar component of small thickness and the recess is a cavity having approximately the same dimensions and the same shape as those of the tray.

In a preferred manner, the end of the recess furthest away from the headrest has an indentation and the tray comprises a planar body which terminates in an inclined edge, said tray being received in the recess so that its inclined edge is received in said indentation and so that the opposite end of said body interacts with the locking mechanism. For this configuration, the tray has two opposite locking ends, one interacting with the locking mechanism and the other being introduced into the backrest, the two contact regions formed in this manner contributing to maintaining the tray against the backrest. Furthermore, when the tray is released from the locking mechanism, it may be withdrawn from the backrest by prior pivoting about the inclined edge thereof which is introduced in the indentation.

Advantageously, the indentation is in the form of an inclination of the base of the recess, the inclined edge of the tray moving into contact with said inclined base. In this manner, the profile of the tray completely corresponds to the profile of the base of the recess so that the whole of its body and its inclined edge are in contact with the base of the recess. Consequently, the tray is tightly pressed against the backrest of the seat, without projecting from the recess.

The inclined edge of the tray preferably comprises two prominent lobes, the recess having a central overhang which overhangs said indentation and the tray is received in the recess so that the two lobes are inserted in the indentation at one side and the other of said central overhang. The central overhang of the recess is used to prevent the tray from moving out of said recess, in particular when the backrest is in a vertical position. That overhang thus acts as a retention stop for the tray positioned in the recess. The central positioning of the overhang allows pivoting of the tray about the two lobes when it is withdrawn from the housing in order to remove it from the backrest.

In an advantageous manner, the rear face of the seat is provided with at least one groove which allows the tray to be received and retained in a deployed position when the backrest is substantially horizontal, and after the tray has been withdrawn from the recess. It is supposed that the width of the groove is compatible with the thickness of the tray so that the tray can be partially accommodated therein. The grooves may equally well be formed in the region of the headrest of the backrest or in the recess. A specific position of the tray corresponds to each groove, the objective being to orientate the tray towards an adjacent seat. For this configuration, the backrest of the seat acts as a support base for the tray. Each groove may be rectilinear or curvilinear. This type of support has particularly small dimensions because the base is constituted by the backrest of the seat already present in the vehicle and each groove advantageously replaces a bulky interface component which may be used for fixing the tray in the deployed position thereof.

The invention further relates to a tray which is intended to be fitted to a seat according to the invention and whose main technical feature is that it comprises an elongate planar body having at one of the ends thereof an inclined edge which is provided with two lateral lobes and, at the opposite end thereof, a clip which is intended to retain a paper document. A paper document may be, for example, constituted by a single sheet, a block or a book.

Finally, the invention relates to a vehicle which comprises a row of at least two seats and the main technical feature of which is that it comprises at least one seat according to the invention.

According to a preferred embodiment of a vehicle according to the invention, said vehicle comprises a row of three seats, the central seat of which is in accordance with the invention. In this manner, once the backrest of the central seat has been folded down, the tray may be withdrawn by one of the two occupants of the two adjacent seats and be deployed on the folded backrest with an orientation towards one of the adjacent seats. The driver or the passenger may thus make use of this tray.

The seats according to the invention have the advantage of having a constant spatial requirement in relation to a conventional seat already in existence whilst providing an additional functionality via the removable tray. They further have the advantage of involving a minimum of components for retaining the stored tray in the backrest and for deploying it in a functional position on the backrest. Therefore, they are easy to produce and are therefore of moderate cost.

BRIEF DESCRIPTION OF THE DRAWINGS

A detailed description of a preferred embodiment of a seat according to the invention will be given below with reference to FIGS. 1 to 4, in which.

DETAILED DESCRIPTION

Figure 1:
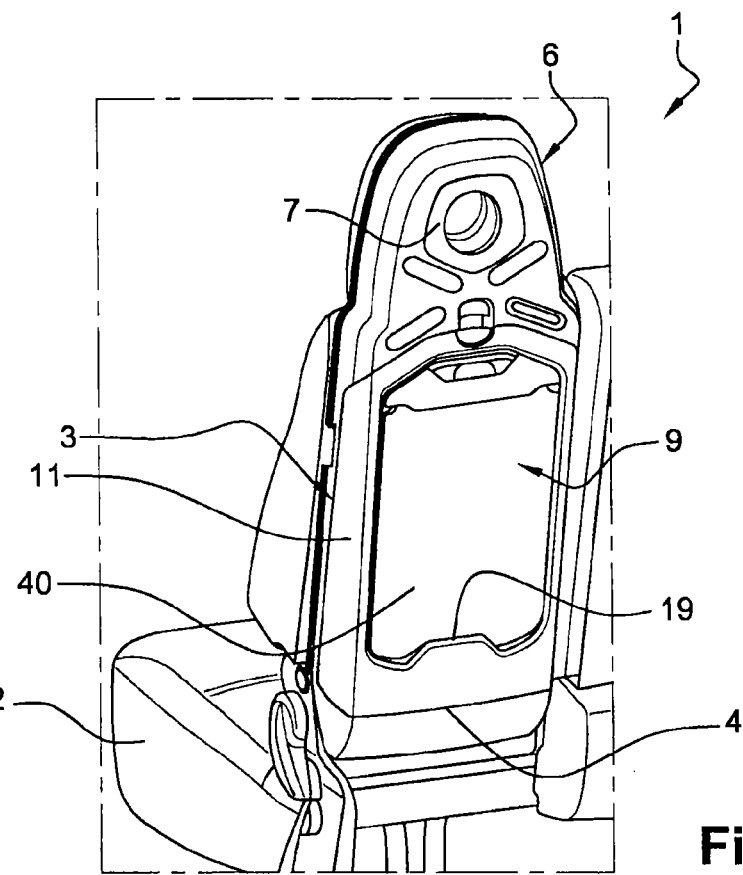
FIG. 1 is a rear perspective view of a seat according to the invention in a functional position.
Figure 2:
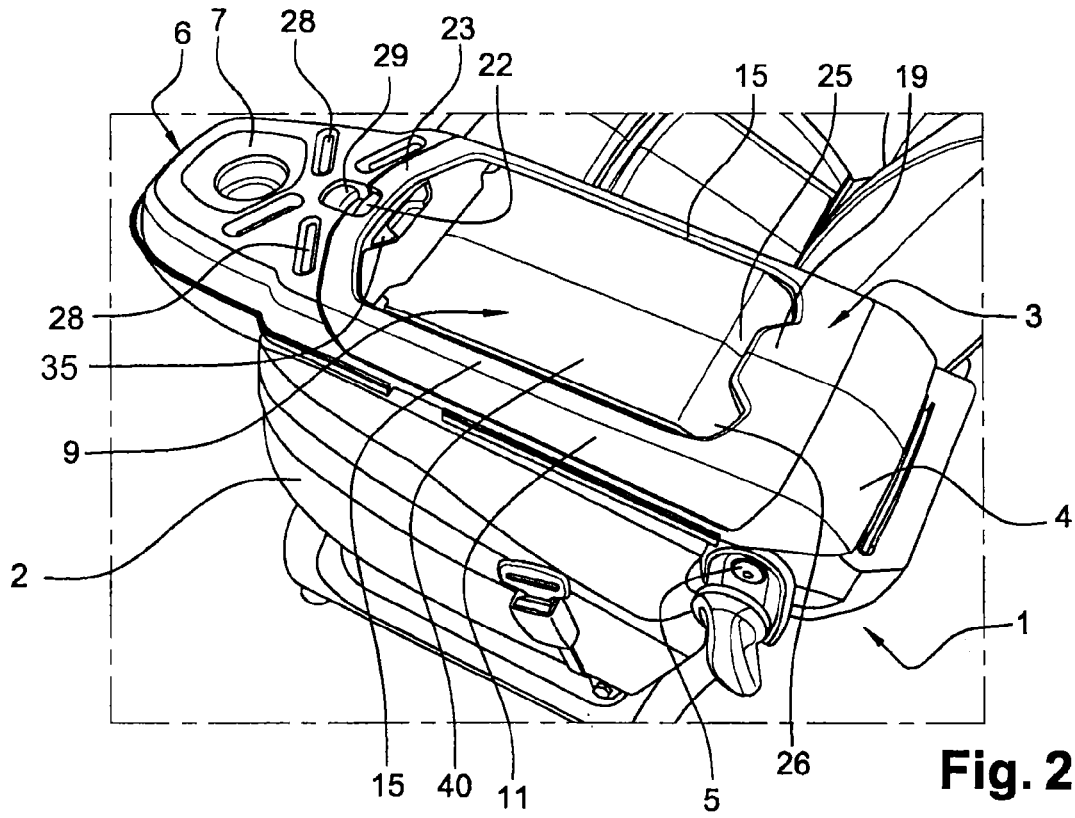
FIG. 2 is a perspective view of the seat of FIG. 2, in a folded position, the tray being stored in the backrest.

With reference to FIGS. 1 and 2, a seat 1 according to the invention conventionally comprises a seat member 2 and a backrest 3 which is capable of pivoting between a functional position for which it is deployed on the seat member 2, as FIG. 1 shows, and a substantially horizontal, folded position for which it moves into contact with the seat member, as FIG. 2 shows. The backrest 3 thus has a first end 4 near the seat member 2 and is mounted so as to pivot about a horizontal and transverse axis 5, and a second end 6 corresponding to a headrest 7. It is assumed that a longitudinal axis of the backrest 3 connects the first end and the second end 4, 6. The backrest 3 comprises a rear face in which a tray 9 which is provided with a clip 27 is stored, the tray 9 being planar and having a small thickness, and being arranged on said rear face providing a given continuity in terms of the outer envelope of the seat 1.

Figure 3:
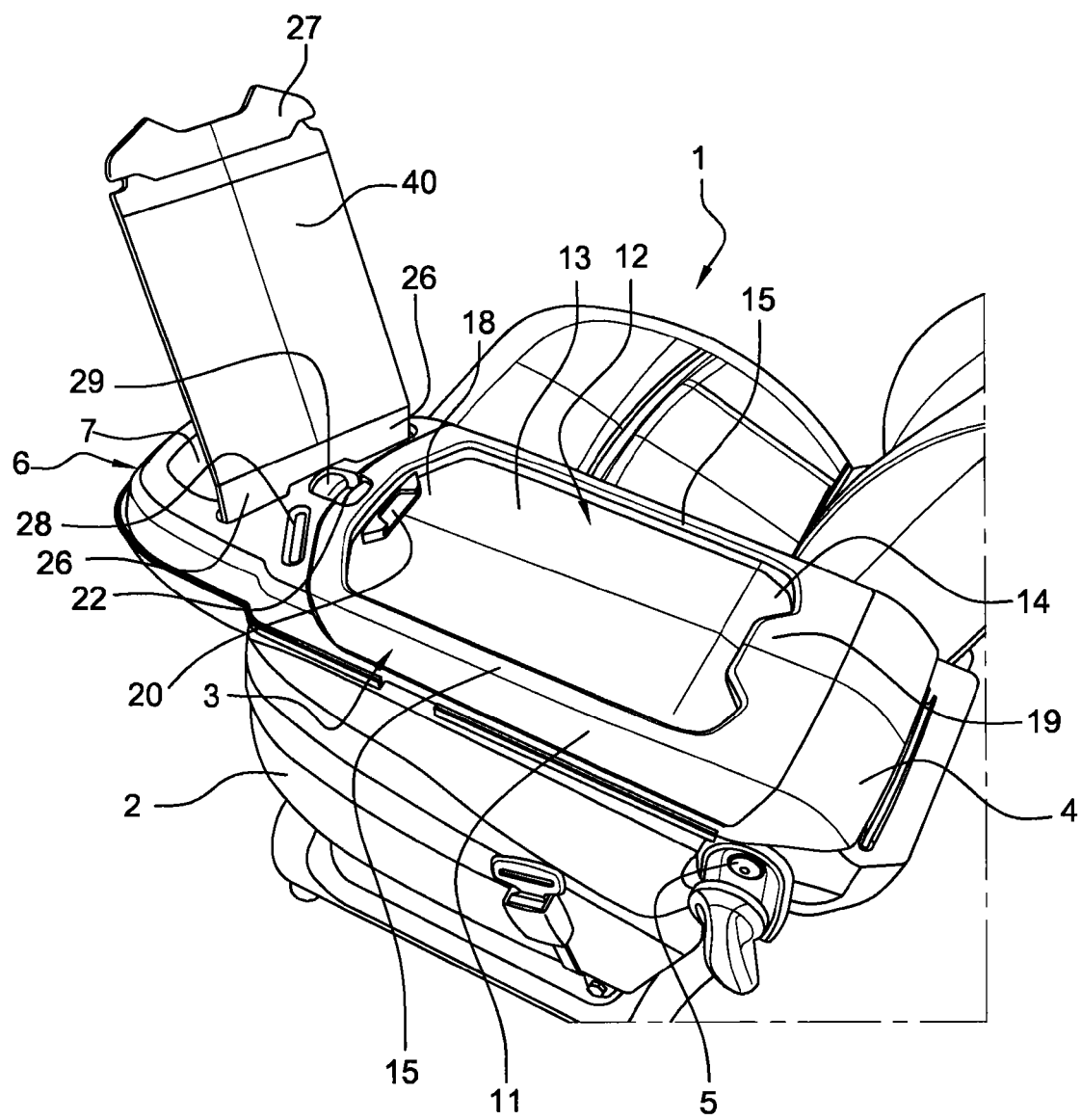
FIG. 3 is the view of FIG. 2, the tray being deployed on the folded seat.

With reference to FIG. 3, the backrest 3 comprises a location in which there is fixed an approximately rectangular receiving frame 11 whose thickness is less than that of the backrest 3, whose width is identical to that of the backrest 3 and whose length is less than that of the backrest 3. In this manner, the frame 11 is included in the backrest 3 and partially delimits its width. That frame 11 comprises a recess 12 which has a planar base 13 and which is extended by an indentation 14. The portion of the recess 12 corresponding to the planar base 13 is delimited by two large parallel segments 15, by a small segment 16 which is perpendicular to said large segments 15 and by a profiled segment 17 which allows the recess 12 to have a central extension 18. The indentation 14 is in the form of a base inclined in a direction which accentuates the depth of said recess 12, said inclined base being in continuation of the planar base 13 in the region of the small segment 15 thereof. The frame 11 has a central overhang 19 of a material which overhangs the indentation 14, said overhang 19 being positioned in alignment with said indentation 14 without occupying the portion of the recess 14 with a planar base 13. The recess 12 extends in a longitudinal axis of the backrest 3 so that its central extension 18 is located near the headrest 7 and so that the indentation 14 is located near the rotation axis 5 of the backrest 3 on the seat member 2. The frame 11 may be withdrawn from the backrest 3 by means of a pressure on a pin 22 which extends from an edge 23 of said frame 11. A locking mechanism which involves a mechanical stop 35 is positioned in the receiving frame 11 in the region of the central extension 18 of the recess 12, said mechanism comprising an activation push-button 20 which extends out of the recess 12 between an end edge 23 of said frame 11 delimiting the central extension 18 of the recess 12 and the tray 9.

With reference to FIGS. 2 and 3, the tray 9 is constituted by a thin, planar plate 40 of substantially rectangular form, said plate 40 being extended in a longitudinal axis by, on the one hand, an inclined rim 25 having two lateral lobes 26 and, on the other hand, a conventional clamping clip 27 which is configured to retain at least one sheet of paper against the plate 40. That tray 9 therefore acts as a support for a paper document so that a person may read said document or may write thereon.

With reference to FIG. 2, in a storage position, the tray 9 occupies the recess 12 so that its inclined rim is in the indentation 14, the two lobes 26 being positioned at one side and the other of the central overhang 19 of the frame 11 and so that the plate 40 is in contact with the planar base 13 of the recess 12, the end of the plate 40 comprising the clip 27 cooperating with the locking mechanism. The tray 9 is stored in the backrest 3 without any of its portions extending out of the recess 12, said tray 9 ensuring a given continuity of the surface, in the region of the rear face of said backrest 3. When the tray 9 is stored in the receiving frame 11 of the rear face of the backrest 3, the activation push-button 20 remains accessible from the outer side of the seat 1. A return element is associated with that push-button 20 so that it remains, by default, in a projecting position in the locking configuration. In this manner, without any pressure on said push-button 20, the tray 9 is by default locked against the backrest 3 of the seat 1. The rear face of the backrest 3 corresponding to the headrest 7 comprises four grooves 28 which are arranged in the form of a cross, two grooves 28 being aligned in accordance with a first axis and the other two grooves 28 being aligned in accordance with a second axis, said axes intersecting with each other, each groove 28 of the same axis being located at each side of the notional intersection location of said axes. Each groove 28 is constituted by a rectilinear aperture which has finite length and which is closed by a biased removable element, each of said elements being connected to a secondary push-button 29 which is positioned near the activation push-button 20. Each closure element naturally covers the groove 28, pressure on the secondary push-button 29 bringing about the instantaneous retraction of said element in order to release the groove 28 in order to introduce the tray 9 therein.

With reference to FIG. 3, once the tray 9 has been withdrawn from the backrest 3, it may be deployed on said folded backrest 3 in the region of the grooves 28. This is because two aligned grooves 28 are intended to receive the two lobes 26 of the tray 9 so that it occupies a first position, the other two aligned grooves 28 allowing said tray 9 to occupy a second position. The tray 9 may thus be deployed on the folded seat 1 so as to be in a slightly inclined plane with respect to a vertical plane, the clip 27 constituting its highest zone.

Figure 4:
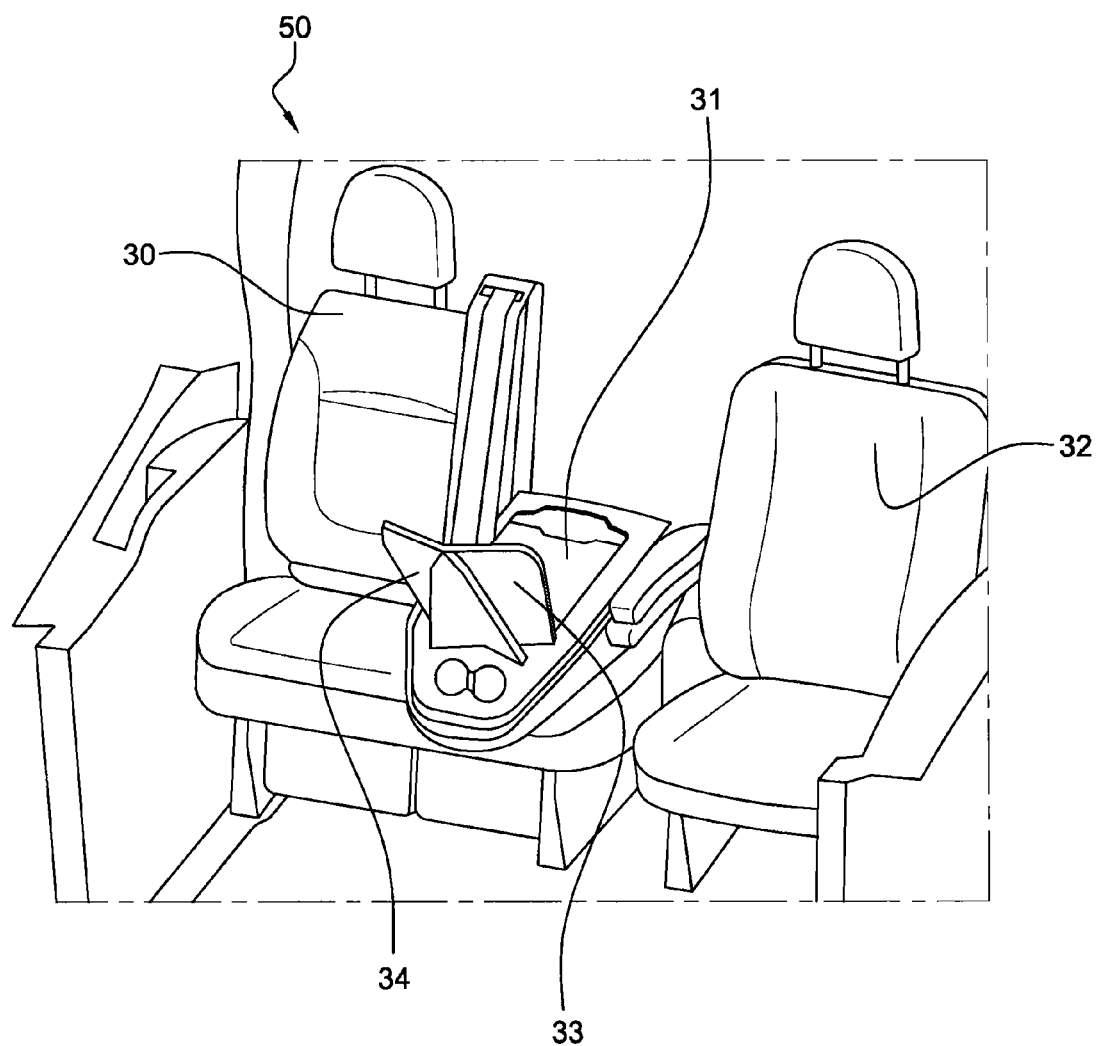
FIG. 4 is a partial perspective view of the interior of a vehicle according to the invention.

With reference to FIG. 4, a motor vehicle 50 according to the invention comprises a row of three aligned seats 30, 31, 32, the central seat 31 of which is in accordance with the seat 1 previously described. The tray 9 may thus occupy a first position 33 which is orientated towards a first adjacent seat 30, or a second position 34 which is orientated towards another adjacent seat 32. In order to remove any ambiguity, FIG. 4 indicates the tray 9 in two separate positions which it cannot occupy simultaneously, and not a single tray of complex form.

The positioning of a tray 9 in a deployed position on the folded backrest 3, starting from the position thereof stored at the rear of the backrest 3, follows the following steps. Pressure on the activation push-button 20 releases the tray 9, which is withdrawn from the recess 12 by said tray 9 being pivoted about the two lobes 26 thereof placed in the indentation 14 of said recess 12. The tray 9 is brought above the two aligned grooves 28 which correspond to the desired position. Pressure on the secondary push-button 29 releases the grooves 28 and the tray 9 is introduced into said grooves 28 in the region of the two lobes 26 thereof. Releasing the secondary push-button 29 allows the tray 9 to be locked in the grooves 28 by means of the biased elements which apply a pressure to the tray 9. In order to move the tray 9 from its deployed position to its stored position, a pressure on the secondary push-button 29 releases the grooves 28 and the tray 9 can then be withdrawn from said grooves 28. The tray 9 is then inserted in the recess of the receiving frame 11 by first introducing the two lobes 26 thereof into the indentation 14. The tray 9 is then subjected to a rotation in order to be brought into contact with the base of the recess 12. Simultaneously, a pressure on the activation push-button 20 releases the locking mechanism in order to allow complete insertion of the tray 9 into the recess 12. The pressure on said button 20 is then released in order to lock the tray 9 in its storage position behind the backrest 3.

The invention claimed is:

1. A seat of a motor vehicle comprising:
    a seat member; and
    a foldable backrest comprising a rear face including a tray, a recess, and at least one groove, the backrest configured to be folded onto the seat member to bring the rear face into a substantially horizontal position,
    wherein, in a first position, the tray is fitted within the recess and against the rear face of the backrest and is retained within the recess and against the rear face by a locking mechanism including an activation member,
    wherein, in a second position, the tray is received in and retained by the at least one groove, the at least one groove being spaced apart from the recess such that the tray is not in the recess in the second position,
    wherein a pressure applied to the activation member allows the tray to be released to be withdrawn from the backrest.

2. The vehicle seat as claimed in claim 1, wherein the locking mechanism includes at least one mechanical stop brought into contact with the tray to maintain the tray against the backrest, and a pressure applied to the activation member brings about movement of the at least one mechanical stop.

3. The vehicle seat as claimed in claim 1, wherein the locking mechanism is configured to allow the activation member to resume an initial position after being subjected to pressure.

4. The vehicle seat as claimed in claim 1, wherein the backrest includes a headrest, and wherein the locking mechanism is located in a region of an end of the recess nearest the headrest.

5. The vehicle seat as claimed in claim 4, wherein an end of the recess furthest away from the headrest includes an indentation, and the tray comprises a planar body that terminates in an inclined edge, the tray being received in the recess so that the inclined edge is inserted in the indentation and so that an opposite end of a body interacts with the locking mechanism.

6. The vehicle seat as claimed in claim 5, wherein the inclined edge of the tray includes two prominent lobes, and the recess includes a central overhang that overhangs the indentation, the tray being received in the recess so that the two lobes are inserted in the indentation at one side and the other side of the central overhang.

7. The vehicle seat as claimed in claim 6, wherein the at least one groove includes two grooves and, in the second position, the two lobes of the tray are received in the two grooves.

8. The vehicle seat as claimed in claim 4, wherein the at least one groove is positioned on the headrest.

9. A tray configured to be fitted to a seat as claimed in claim 1, comprising an elongate planar body including at one of the ends thereof an inclined edge including with two lateral lobes and, at an opposite end thereof, a clip configured to retain a paper document.

10. A vehicle comprising a row of at least two seats, comprising at least one seat as claimed in claim 1.

11. The vehicle as claimed in claim 10, comprising a row of three seats, and a central seat is the at least one seat.

12. The vehicle seat as claimed in claim 1, wherein, in the first position, no portions of the tray extend out of the recess.

13. The vehicle seat as claimed in claim 1, wherein the at least one groove includes four grooves, including a first groove and a second groove aligned on a first axis and a third groove and a fourth grove aligned on a second axis.

14. The vehicle seat as claimed in claim 13, wherein the first axis and the second axis intersect to form a cross.

15. The vehicle seat as claimed in claim 1, wherein, in the first position, the tray is separated from the at least one groove.

* * * * *